(12) United States Patent
Seibl

(10) Patent No.: US 7,752,903 B2
(45) Date of Patent: Jul. 13, 2010

(54) ROLLER BRAKE TESTING DYNAMOMETER

(75) Inventor: Erich Seibl, Tussling (DE)

(73) Assignee: Snap-On Equipment GmbH, Pfungstadt (DE)

( * ) Notice: Subject to any disclaimer, the term of this patent is extended or adjusted under 35 U.S.C. 154(b) by 40 days.

(21) Appl. No.: 11/826,990

(22) Filed: Jul. 19, 2007

(65) Prior Publication Data

US 2008/0022761 A1 Jan. 31, 2008

(30) Foreign Application Priority Data

Jul. 19, 2006 (DE) .................. 20 2006 011 164 U
Jan. 17, 2007 (DE) .................. 20 2007 001 016 U

(51) Int. Cl.
*G01M 17/007* (2006.01)
(52) U.S. Cl. ........................................... 73/123
(58) Field of Classification Search .................. 73/121, 73/123, 124, 125, 126, 128, 129
See application file for complete search history.

(56) References Cited

U.S. PATENT DOCUMENTS

| | | | |
|---|---|---|---|
| 4,745,469 A | 5/1988 | Waldecker et al. | |
| 4,899,218 A | 2/1990 | Waldecker et al. | |
| 5,269,179 A * | 12/1993 | Vattakattu et al. | 73/116.06 |
| 5,402,674 A * | 4/1995 | Ganzhorn et al. | 73/116.06 |
| 6,691,573 B2 | 2/2004 | Silvagi et al. | |
| 7,493,805 B2 * | 2/2009 | Ben-David | 73/117.02 |
| 2004/0000191 A1 * | 1/2004 | Ben-David | 73/118.1 |
| 2006/0130567 A1 * | 6/2006 | Ben-David | 73/118.1 |

FOREIGN PATENT DOCUMENTS

| | | |
|---|---|---|
| DE | 101 46 533 A1 | 4/2003 |
| DE | 103 33 762 A1 | 2/2005 |
| DE | 20 2005 014 554 U1 | 2/2006 |
| DE | 20 2005 014 554 U1 | 3/2006 |
| DE | 20 2005 018 573 U1 | 3/2006 |
| DE | 20 2005 018 753 U1 | 4/2006 |
| GB | 2 314 928 A | 1/1998 |
| WO | WO 96/37754 | 11/1996 |
| WO | WO 98/34090 | 8/1998 |

* cited by examiner

*Primary Examiner*—Eric S McCall
(74) *Attorney, Agent, or Firm*—McDermott Will & Emery LLP

(57) ABSTRACT

The present invention relates to a roller brake testing dynamometer (P) for vehicles whose braking forces are to be ascertained, wherein there is provided at least one roller (L) which is driven by way of a drive (A) in order in turn to drive a vehicle tire (R) bearing against the roller (L), and wherein the dynamometer (P) has at least one contact-less sensor unit (S) for detecting the position of the tire (R) relative to the at least one roller (L).

14 Claims, 2 Drawing Sheets

ROLLER BRAKE TESTING DYNAMOMETER

FIELD OF DISCLOSURE

The present invention concerns a roller brake tester whose braking forces are to be ascertained.

BACKGROUND

In that respect braking testers are known from the state of the art, comprising two rollers which are arranged in mutually parallel relationship and on to which a vehicle tyre is driven so that it comes to lie between and above those two rollers. In that case at least one of the two rollers is driven by a drive in order in turn to cause the vehicle tyre resting thereon to rotate. If in that situation the vehicle tyre is braked, the required drive moment is increased, and that can be detected as a braking force, by a suitable sensor.

The known testers have between the two rollers described hereinbefore, a sensing roller which is vertically displaceably mounted and which in that respect performs a switching function. As soon as the vehicle tyre is driven on to the two rollers the sensing roller which is disposed therebetween is urged downwardly and thereby initiates the testing operation or starts the roller drive.

Testers of that kind are structurally complicated and expensive and susceptible to wear. In addition during the brake testing operation the operating personnel must constantly monitor whether the vehicle is remaining in the predetermined orientation or is for example drifting off laterally. That means that operation of such testers is not very comfortable and convenient.

Therefore the object of the invention is to provide a simplified roller brake tester which in terms of its construction and also operation is simpler and user-friendly.

SUMMARY

That object is attained by a roller brake tester as set forth in the claims.

The invention is based on the realisation that it is possible to save on the sensing roller known from the state of the art if at least one non contact sensor unit is provided for detecting the position of the vehicle tyre relative to the at least one roller. Such a non contact sensor saves on the need for the previously known sensing roller and considerably simplifies the structure of the tester. Instead, the sensor unit can detect when a vehicle tyre is driven on to the tester rollers in a contact-less manner and accurately and can enable or start the testing operation by means of a control unit. The sensor unit requires only a small amount of structural space, it involves a small amount of wear and in addition it is also capable of supplying precise position signals in order to detect a possible deviation of the vehicle tyre from the predetermined track. That advantageously enhances operation and safety of the tester and at the same time simplifies the structural complication involved, with a lesser risk of wear or breakdown.

DETAILED DESCRIPTION

Figure 1:
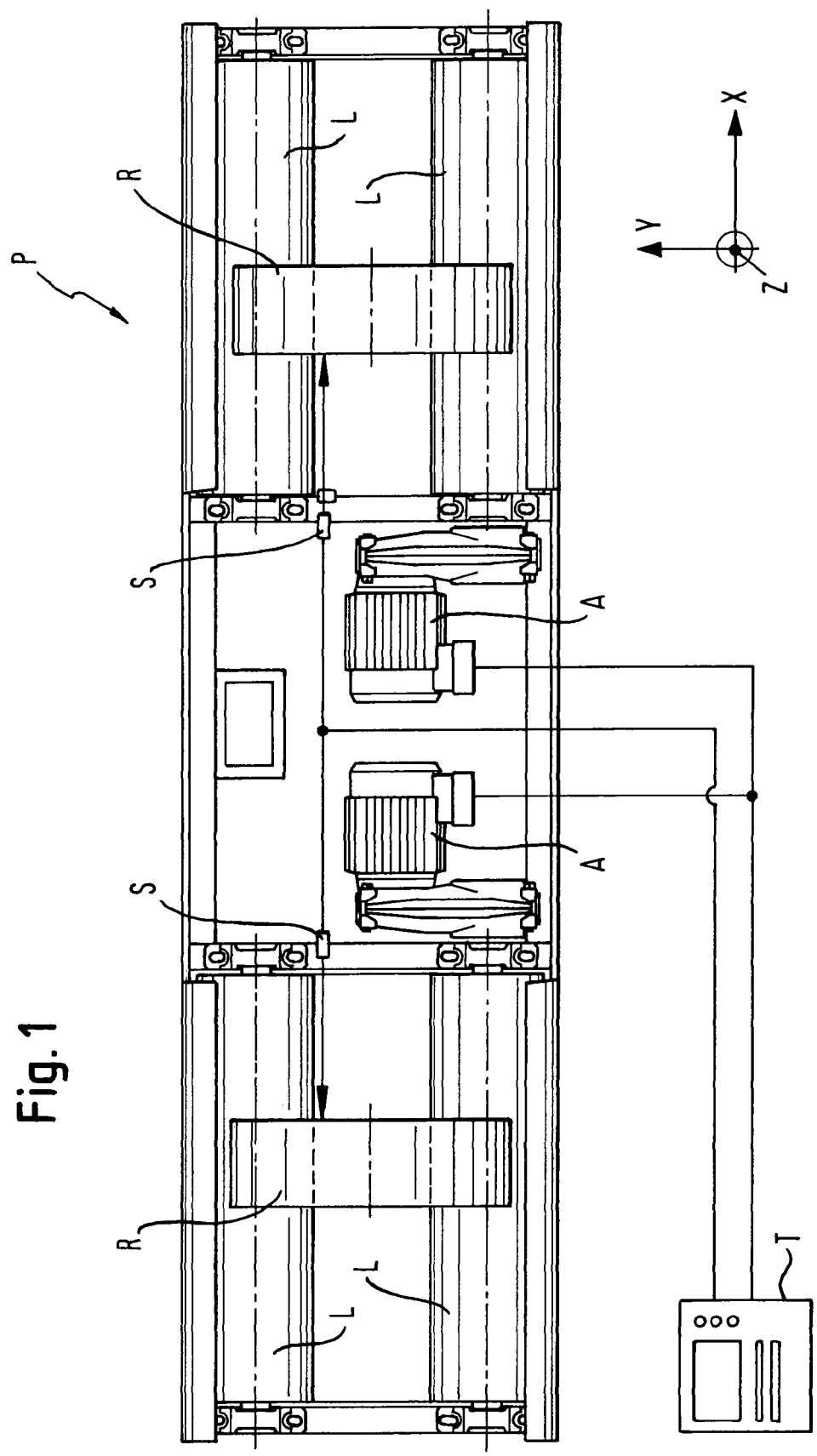
FIG. 1 shows a diagrammatic plan view of a brake tester P according to the invention.

In a very simple embodiment there is provided a roller brake tester having at least one roller driven by way of a drive. The roller in turn is intended to drive a vehicle tyre which is resting on the roller, for which purpose the vehicle tyre is driven above or in displaced relationship therewith laterally on to the roller. In accordance with the invention it is further provided that the tester includes at least one non contact sensor unit for detecting the position of the tyre relative to the driven roller. Thus a vehicle tyre which is being driven on to the roller can be detected in a contact-less manner and with a low level of wear, wherein the sensor signal can be evaluated for further control of the tester.

A further advantageous embodiment of the invention provides that the at least one sensor unit is a triangulation sensor unit. In that case a bearing is taken on the object to be detected, by a transmitter, while a receiver receives the reflection returning from the object. When the distance from the transmitter to the receiver is known and when the angles of incidence and reflection which are to be measured are also known it is possible in that way to establish the position of the object in a plane or, in an expanded form, also in space. Typically the transmitter can include a light source, for the most part a laser light source, while the receiver receives the reflected scatter light. Sensor systems of that kind can detect the position of an object with a very high degree of accuracy and at the same time involve a low level of wear and are simple to handle.

In that sense, in accordance with a further advantageous embodiment of the invention, it is provided that the sensor unit is adapted to detect horizontal drift of the tyre out of a predeterminable reference or target position. In that way the intention is to be able to detect in particular axial displacement of the vehicle tyre in the longitudinal direction of the driving roller or rollers. As soon as the tyre is displaced outside predeterminable tolerances in the axial direction, the corresponding signal could be used to switch off the tester or deliver a warning indication. That advantageously ensures that the vehicle tyre does not migrate laterally beyond the driving roller or run against the boundary edge of an opening in a floor plate below which the rollers of the tester are disposed. On the one hand that avoids damaging wear to the vehicle tyre while on the other hand reliably excluding braking measurement values which would then be falsified.

In accordance with a further advantageous embodiment of the invention the sensor unit is to be adapted to detect a tyre which moves perpendicularly to the axis of the tester rollers. That could happen when the braking force is sufficiently great to pull the vehicle forwardly or rearwardly beyond the driving roller. In that case also the vehicle tyre would move out of the intended reference position, namely the symmetrical position on the one tester roller or between two tester rollers. In accordance with the invention such a sensor unit is capable of detecting both a tyre which is moving on a roller and also a tyre which is moving down therefrom. The sensor system which is adapted to detect such relative movements of the tyre here too again makes it possible to output a warning signal or to shut down the tester without unnecessary time delay and in particular automatically, that is to say without the need for intervention on the part of the operating personnel.

A further embodiment of the invention advantageously provides a control unit for controlling the tester, which is adapted to evaluate at least one signal from the sensor unit. In that respect the control unit is capable of controlling further functions of the tester such as in particular switching on or switching off the drive for the roller or also the output of warning signals, in dependence on the signals supplied to the control unit from the at least one sensor unit. In addition the signals from the sensor system can also be used to document the pattern in respect of time involved in the brake testing procedure, insofar as for example when the vehicle tyre is driven on to the tester the time for the testing attempt which is then started is recorded.

In particular the control unit is to be adapted to output a signal and/or to switch the at least one drive off or on if the sensor unit signals a movement of the tyre relative to the roller outside predeterminable tolerances. That allows safe reliable operation of the tester within the predetermined tolerances and permits automatic shutdown for example for the situation where the vehicle tyre moves excessively far in the axial direction, runs excessively far on to a testing roller, and so forth.

In accordance with a further advantageous embodiment of the invention the level of measurement accuracy of the sensor unit can be increased in that the rotation or rotary speed of the vehicle tyre can also be ascertained. For that purpose, in accordance with the invention, the sensor unit is directed on to irregular configurations of the rotating vehicle tyre. That can be a vehicle rim having openings passing therethrough, the tyre valve or even the tyre profile. Depending on the respective measurement accuracy of the sensor used, as the vehicle tyre rotates, the sensor ascertains different 'positions' of the vehicle tyre for example whenever the peripherally extending recess of the vehicle rim or the tyre valve passes through the zone to which the sensor is directed. Those regular or recurring changes in the measurement values easily allow conclusions to be drawn about the rotary speed or readily permit it to be accurately ascertained.

For safety reasons it is often advisable for start-up of the vehicle tester to be made dependent on the actual presence of a vehicle on the tester. Thus, particularly when using the non contact sensors, it is initially not readily possible to ascertain whether that sensor is actually detecting a vehicle tyre or possibly another object or the foot or the leg of an operator if the operator moves into the range of detection of the sensor. Without a reliable check to ascertain whether a vehicle tyre has actually driven into the tester, the tester would be set in operation. If an operator accidentally passes into the range of detection of the sensor, the at least one roller would be driven, and that represents a serious risk to operational safety.

For that reason a further advantageous embodiment of the invention provides that, before the tester is brought into operation (before the roller or rollers are driven), it is ensured that a vehicle (and not another object) has actually moved into the tester and has passed into the detection range of the sensor.

In that respect a simple safety measure relates to testers with usually two mutually juxtaposed rollers or pairs of rollers (for example for each front wheel, a pair of rollers). As, when a vehicle is driven on to the tester, both pairs of rollers have vehicle wheels driven thereonto at substantially the same time (within a predeterminable tolerance), it must be assumed, if that tolerance is exceeded, that it is not a vehicle tyre but another object that has been detected at least one pair of rollers. In that case, switching-on of the roller drives is to be prevented or is to be possible only by virtue of specific enablement. That advantageously ensures that the brake testing operation can begin, with the drives being switched on, only when a vehicle has been driven into the tester.

For that purpose a control unit of the tester is advantageously so designed that the drives of the rollers can be switched on only when the non contact sensors, in particular triangulation sensors, detect an object within a predeterminable time window, at two separate rollers or pairs of rollers of the tester. If the time window is exceeded, an indication signal could also be outputted or the drives could nonetheless be switched on by deliberate confirmation.

A further embodiment of the invention which is significant in terms of safety aspects relies on the actual movement with which the vehicle is driven on to the tester, for the purposes of detecting it. Typically, when a vehicle is driven on to the tester, the rollers are briefly caused to rotate until the vehicle has reached its intended testing position. Such a rotary movement is detectable, and that can be effected in particular by way of the force pick-ups coupled to the rollers. That brief rotary movement thus generates a measurable signal which can be passed to a control unit of the tester. In that respect, in accordance with the invention the tester is so designed that the rollers are only driven when such a brief rotary movement (caused by a vehicle tyre) is detected and then the non contact sensor detects the presence of an object (there is then a high level of certainty that this involves a vehicle tyre). Without a preceding rotary movement of the at least one roller the control system is intended in accordance with the invention to block the drive of the tester, even if the non contact sensor recognises an object in its intended detection range.

In that respect, switching-on of the drives can be made dependent in particular on the rotary movement of the roller involving a short time interval in relation to subsequent detection of the object which has moved on to the tester, by the sensor, the drive otherwise being inoperative.

The rotary movement signal briefly produced by the vehicle wheel driving on to the tester, at the roller over which the vehicle wheel passes, typically reduces a constant signal value which is present in the rest condition of the tester. In contrast, during the actual brake testing procedure, the value measured at the force pick-ups differs in a positive direction upwardly (for example in the rest condition there is a signal of 1 mA; when the vehicle tyre is driven into the tester that signal is briefly reduced to for example 0.5 mA in order thereafter to rise to 1 mA again. In the context of the brake testing procedure the signal rises in a positive direction to typically from 5 to 10 mA).

By virtue of the briefly negative deflection of the force pick-up signal in opposite relationship to the otherwise usual positive deflection thereof in the braking mode of operation, the control unit can easily detect and evaluate that 'driving-on signal'. In conjunction with the detection signal from the non contact sensor, which is expected subsequently or also at the same time, the criterion for switching on the drive of the at least one roller is then satisfied. In accordance with the invention, if that negative deflection of the force pick-up signal fails to occur, the signal of the non contact sensor is not sufficient to start up the braking mode.

By means of a suitable control unit—similarly to the above-described embodiment having the triangulation sensors—switching-on of the drives of two separate rollers or pair of rollers can in this case also be made dependent on a movement of driving on to the tester being registered for both rollers/pairs of rollers, within a predeterminable time window. Otherwise, it must be assumed that it is not a vehicle but another object that has caused at least one roller to rotate so that the drives fail to be switched on, for the sake of safety.

Further advantageous embodiments of the invention are set forth in the appendant claims.

An embodiment of the invention is described in greater detail hereinafter with reference to FIGS. 1 and 2.

FIG. 1 shows a diagrammatic plan view of a brake tester P according to the invention. The tester P is of a substantially symmetrical configuration and serves for simultaneously receiving two front or rear wheels R of a motor vehicle.

Arranged on each side of the tester P are two rollers L, wherein the respective lower roller L is drivable by a drive A. A vehicle tyre R rests in the operative situation on the two adjacently arranged rollers L and in turn is caused to rotate by the driven roller. Arranged in the region of the roller bearings laterally of the vehicle tyre R are two triangulation sensors S which detect the position of each tyre R in a plane or in space. The two sensors S and the drives A are connected to an evaluation and control unit T in which the signals from the sensors S can be evaluated and possibly converted into control signals for the drives A. The output of optical or acoustic signals is also to be possible by way of the control unit T.

Each triangulation sensor S makes it possible to detect a three-dimensional movement of the vehicle tyre R outside predeterminable tolerances or relative to the rollers L. That can involve an axial deviation in the direction X and equally a movement in radial relationship with the rollers L, that is to say in the direction Y or the direction Z. As soon as such a movement outside predetermined tolerances is detected the associated evaluation and control unit can output corresponding signals or switching commands in order to ensure safe reliable and time-optimised operation of the tester.

Figure 2:
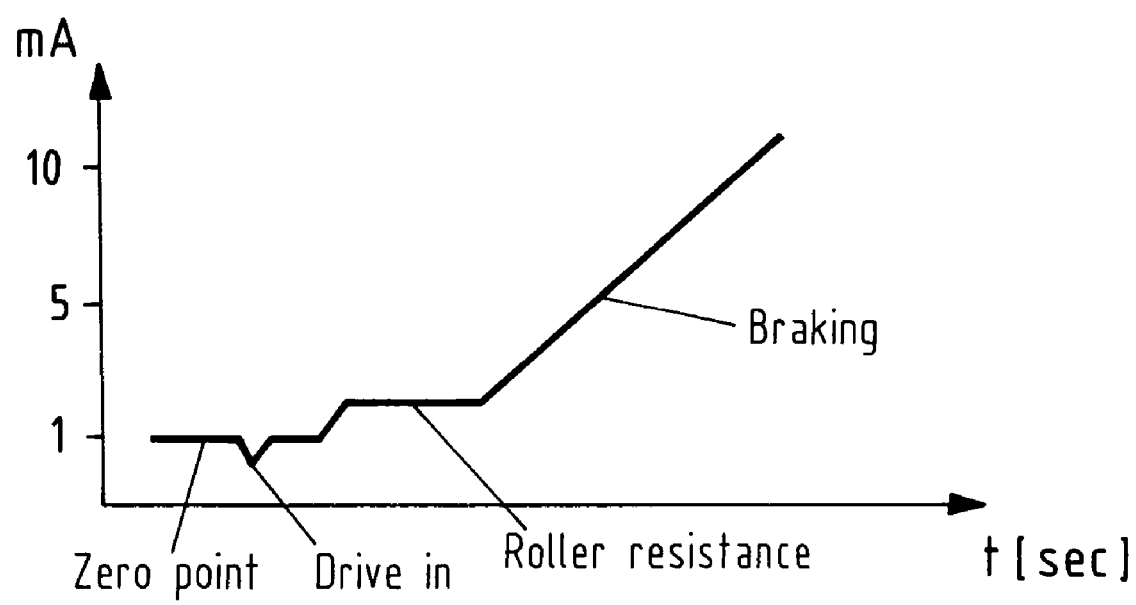
FIG. 2 shows the signal configuration at a tester according to the invention with particular consideration being given to the 'drive-in signal.'

FIG. 2 shows the signal configuration at a tester according to the invention with particular consideration being given to the 'drive-in signal'. Shown therein is the current of a force pick-up, recorded in mA in relation to time (t). The zero point current is at about 1 mA. When a vehicle drives into the tester, with a brief rotary movement of the roller, the signal briefly drops to a value below 1 mA. As soon as the roller has come to a stop again the current is restored to the initial value of about 1 mA. When the actual braking test is being carried out the measured current rises in a positive direction.

The brief drop in current at the moment at which the vehicle is driven into the tester can be easily detected by the control unit according to the invention and evaluated to assess that the roller drives are switched on, as a safety criterion, only when such a drive-in signal has been detected prior to the detection of an object by the non contact sensor.

The invention claimed is:

1. An apparatus comprising:
   a roller brake tester configured to ascertain braking forces of a vehicle, the tester including:
   at least one roller which is driven by way of a drive in order in turn to drive a tyre of the vehicle bearing against the at least one roller, and
   at least one non contact sensor unit for detecting the position of the tyre relative to the at least one roller,
   wherein the sensor unit is oriented onto irregular shape configurations of the rotating tyre to ascertain its rotation and/or rotary speed.

2. A roller brake tester according to claim 1 characterised in that the sensor unit is a triangulation sensor unit.

3. A roller brake tester according to one of the preceding claims characterised in that the sensor unit is adapted to detect a horizontal drift of the tyre out of a predeterminable reference position in a horizontal direction (X).

4. A roller brake tester according to claim 1 or 2 characterised in that the sensor unit is adapted to detect the tyre movement in the (Y)-direction and/or (Z)-direction relative to the at least one roller, wherein the directions (Y) and (Z) extend perpendicularly relative to each other and to a horizontal direction (X).

5. A roller brake tester according to claim 4 characterised in that the sensor unit is adapted to detect the tyre which is driving onto the at least one roller or which is driving down therefrom.

6. A roller brake tester according to claim 1 or 2 characterised in that a control unit is provided for controlling the tester, the control unit being adapted to evaluate at least one signal from the sensor unit.

7. A roller brake tester according to claim 6 characterised in that the control unit is adapted to output a signal and/or to switch the drive off or on if the sensor unit signals a movement of the tyre relative to the roller outside predeterminable tolerances.

8. A roller brake tester according to claim 1 or 2 further including a second roller and a second non contact sensor unit, wherein a control unit is adapted to switch on the drive if the sensor unit and the second sensor unit detect an object within a predeterminable time window.

9. An apparatus comprising:
   a roller brake tester configured to ascertain braking forces of a vehicle, the tester including:
   at least one roller which is driven by way of a drive in order in turn to drive a tyre of the vehicle bearing against the at least one roller,
   at least one non contact sensor unit for detecting the position of the tyre relative to the at least one roller, and
   a control unit characterised in that the control unit is adapted to detect a rotary movement of the at least one roller, caused by the tyre driving onto the tester,
   wherein the control unit is further adapted to switch on the drive if the sensor unit, after detection of the rotary movement, detects a tyre which has driven onto the at least one roller.

10. A roller brake tester according to claim 9 characterised in that the control unit is adapted to switch on the drive if the tyre which has been driven onto the tester is detected within a predeterminable time interval after detection of the rotary movement.

11. A roller brake tester according to claim 9 having a second roller separated from the first roller, characterised in that the control unit is adapted to switch on the drive if a rotary movement is detected within a predeterminable time window for both rollers.

12. A roller brake tester according to claim 9 characterised in that the sensor unit is a triangulation sensor unit.

13. A roller brake testing method comprising steps of:
   coupling at least one roller to a vehicle tyre in a roller brake tester configured to ascertain braking forces of a vehicle;
   driving the roller in order to drive the vehicle tyre bearing against the at least one roller; and
   detecting the position of the tyre relative to the at least one roller using at least one non contact sensor device,
   wherein the sensor device is oriented onto irregular shape configurations of the rotating tyre to ascertain its rotation and/or rotary speed.

14. A roller brake testing method comprising steps of:
   coupling at least one roller to a vehicle tyre in a roller brake tester configured to ascertain braking forces of a vehicle;
   driving the roller in order to drive the vehicle tyre bearing against the at least one roller;
   detecting the position of the tyre relative to the at least one roller using at least one non contact sensor device; and
   detecting, via a control unit, a rotary movement of the at least one roller, caused by the tyre driving onto the tester,
   wherein the control unit is adapted to switch on the drive if the sensor device, after detection of the rotary movement, detects a tyre which has driven onto the at least one roller.

* * * * *